United States Patent
Woodell et al.

(10) Patent No.: US 7,515,088 B1
(45) Date of Patent: Apr. 7, 2009

(54) WEATHER RADAR DETECTION SYSTEM AND METHOD THAT IS ADAPTIVE TO WEATHER CHARACTERISTICS

(75) Inventors: Daniel L. Woodell, Cedar Rapids, IA (US); Roy E. Robertson, Marion, IA (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 0 days.

(21) Appl. No.: 11/527,878

(22) Filed: Sep. 27, 2006

Related U.S. Application Data

(63) Continuation-in-part of application No. 11/402,434, filed on Apr. 12, 2006, which is a continuation-in-part of application No. 11/256,845, filed on Oct. 24, 2005, which is a continuation of application No. 10/631,253, filed on Jul. 31, 2003, now Pat. No. 7,129,885.

(51) Int. Cl.
*G01S 13/95* (2006.01)
*G01S 13/00* (2006.01)

(52) U.S. Cl. ............ 342/26 B; 342/26 R; 342/89; 342/90; 342/175; 342/195

(58) Field of Classification Search ...... 342/26 R–26 D, 342/89, 90, 175, 195, 52–55, 73–103, 165, 342/173
See application file for complete search history.

(56) References Cited

U.S. PATENT DOCUMENTS

| | | | |
|---|---|---|---|
| 3,964,064 A * | 6/1976 | Brandao et al. ........ 342/26 B |
| 4,283,715 A | 8/1981 | Choisnet | |
| 4,283,725 A | 8/1981 | Chisholm | |
| 4,435,707 A * | 3/1984 | Clark ........ 342/26 B |
| 4,555,703 A * | 11/1985 | Cantrell ........ 342/26 R |
| 4,613,938 A * | 9/1986 | Hansen et al. ........ 342/26 R |
| 4,835,536 A | 5/1989 | Piesinger et al. | |
| 5,049,886 A | 9/1991 | Seitz et al. | |
| 5,077,558 A | 12/1991 | Kuntman | |
| 5,198,819 A | 3/1993 | Susnjara | |
| 5,311,183 A | 5/1994 | Mathews et al. | |
| 5,311,184 A * | 5/1994 | Kuntman ........ 342/26 B |
| 5,945,926 A | 8/1999 | Ammar et al. | |
| 6,081,220 A * | 6/2000 | Fujisaka et al. ........ 342/26 D |
| 6,154,169 A | 11/2000 | Kuntman | |
| 6,177,873 B1 * | 1/2001 | Cragun ........ 342/26 R |
| 6,201,494 B1 | 3/2001 | Kronfeld | |
| 6,208,284 B1 | 3/2001 | Woodell et al. | |
| 6,236,351 B1 | 5/2001 | Conner et al. | |

(Continued)

FOREIGN PATENT DOCUMENTS

EP 1329738 A1 7/2003

(Continued)

OTHER PUBLICATIONS

U.S. Appl. No. 11/402,434, filed Apr. 12, 2006, Woodell et al.

(Continued)

*Primary Examiner*—Bernarr E Gregory

(57) ABSTRACT

A method of detecting weather on an aircraft uses a weather radar system. The method includes determining a classification of weather and automatically adjusting the weather radar system in response to the classification of the weather. The classification of the weather can relate to weather type and maturity levels.

21 Claims, 8 Drawing Sheets

U.S. PATENT DOCUMENTS

| | | | |
|---|---|---|---|
| 6,240,369 B1 * | 5/2001 | Foust | 342/26 R |
| 6,388,607 B1 | 5/2002 | Woodell | |
| 6,388,608 B1 * | 5/2002 | Woodell et al. | 342/26 R |
| 6,424,288 B1 * | 7/2002 | Woodell | 342/26 R |
| 6,456,226 B1 | 9/2002 | Zheng et al. | |
| 6,512,476 B1 | 1/2003 | Woodell | |
| 6,549,161 B1 | 4/2003 | Woodell | |
| 6,577,947 B1 | 6/2003 | Kronfeld et al. | |
| 6,597,305 B2 * | 7/2003 | Szeto et al. | 342/26 R |
| 6,603,425 B1 * | 8/2003 | Woodell | 342/26 R |
| 6,614,382 B1 | 9/2003 | Cannaday, Jr. et al. | |
| 6,650,275 B1 * | 11/2003 | Kelly et al. | 342/26 R |
| 6,667,710 B2 * | 12/2003 | Cornell et al. | 342/26 R |
| 6,670,908 B2 * | 12/2003 | Wilson et al. | 342/26 R |
| 6,677,886 B1 * | 1/2004 | Lok | 342/26 R |
| 6,690,317 B2 | 2/2004 | Szeto et al. | |
| 6,741,203 B1 * | 5/2004 | Woodell | 342/26 B |
| 6,850,185 B1 | 2/2005 | Woodell | |
| 6,879,280 B1 | 4/2005 | Bull et al. | |
| 6,882,302 B1 | 4/2005 | Woodell et al. | |
| 7,042,387 B2 | 5/2006 | Ridenour et al. | |
| 7,129,885 B1 | 10/2006 | Woodell et al. | |
| 2003/0016156 A1 | 1/2003 | Szeto et al. | |

FOREIGN PATENT DOCUMENTS

FR      2658617 A1 *   8/1991

OTHER PUBLICATIONS

U.S. Appl. No. 11/256,845, filed Oct. 24, 2005, Woodell et al.
U.S. Appl. No. 11/370,085, filed Mar. 7, 2006, Woodell et al.
Pessi, Antti et al., "On the Relationship Between Lightning and Convective Rainfall Over the Central Pacific Ocean," date unknown, pp. 1-9.
Zipser, Edward J. et al., "The Vertical Profile of Radar Reflectivity of Convective Cells: A Strong Indicator of Storm Intensity And Lightning Probability?" Monthly Weather Review (Aug. 1994, vol. 122, pp. 1751-1759).

\* cited by examiner

| Specific Classification Dependent Output Processes | | |
|---|---|---|
| WX Classification | Adapted Process | Intended Output |
| Convective - Growing | Growth Gain Model<br>Growth Prediction<br>Lightning Correlation | Vertical Hazard Extension<br>Overflight Hazard Prediction |
| Convective - Mature | Mature Gain Model<br>Mature Hazard Allocation<br>Lightning Correlation | Convective Hazard Alerts<br>Lightning, Hail, Turb |
| Convective - Decaying | Decaying Gain Model | Lightning Hazard<br>De-emphasize Reflectivity Hazard Level |
| Stratiform | Stratiform Gain Model<br>Bright Band Compensation | Reduced Hazard Indication |
| Orographic | Association With Geographic Features<br>Orographic Gain Model | Reduced Hazard Indication |

Figure 8

WEATHER RADAR DETECTION SYSTEM AND METHOD THAT IS ADAPTIVE TO WEATHER CHARACTERISTICS

CROSS-REFERENCE TO RELATED APPLICATIONS

This application is a continuation-in-part of and claims priority to U.S. application Ser. No. 11/402,434, filed Apr. 12, 2006 which is a continuation-in-part of and claims priority to U.S. patent application Ser. No. 11/256,845, filed Oct. 24, 2005 which is a continuation of U.S. patent application Ser. No. 10/631,253, filed Jul. 31, 2003 now U.S. Pat. No. 7,129,885. U.S. application Ser. Nos. 11/402,434, 11/256,845 and 10/631,253 are assigned to the Assignee in the patent application and are incorporated herein by reference.

BACKGROUND OF THE INVENTION

Conventionally, pilots use weather radar to detect and avoid hazardous weather. Conventional radar systems may produce the desired results only in a limited environment. Typically, airborne threshold systems use thresholds for wet precipitation derived from ground-based weather radar thresholds generated from convective weather. Such thresholds have been set in accordance with reflectivity data which is applicable to typical convective weather systems in continental environments but not necessarily in maritime regions. It has been observed that maritime storm reflectivity differs substantially from continental storm reflectivity. Research by Zipser and Lutz in "The Vertical Profile of Radar Reflectivity of Convective Cells: A Strong Indicator of Storm Intensity and Lightning Probability?", Monthly Weather Review of the American Meteorological Society, 1751-1759 (August 1994), characterizes the differences in reflectivity of continental versus maritime convective storms. Below the freezing altitude, the research shows that maritime storm reflectivity averages 8 dB below that of continental storms with peak maritime reflectivities observed at near sea level while peak continental reflectivities are observed at about the 8000 foot region. Above the freezing altitude, the reflectivity of maritime cells falls off at an average rate of 1.4 dB per 1000 feet versus the falloff rate of 0.45 dB per 1000 feet for continental storms. Peak reflectivity differences between the two populations of cells peak at about the 23 dB range at about 28,000 feet.

Conventionally, radar thresholds map radar return strength to a display with color representing rain rate or alternatively a weather threat assessment level. The threat level has been previously described as primarily a function of radar reflectivity and a weaker function of temperature, altitude, and latitude. However, because of the difference in maritime and continental weather, the conventional mapping while useful, does not completely allow successful operation of aircraft in maritime regions. The lower reflectivity of maritime weather does not allow for successful detection of significant convective weather systems during flight. Further, because of the ability of aircraft flying over maritime regions to circumnavigate storm systems, if recognized, it would therefore be desirable to provide an airborne radar system which has the ability to more accurately detect and report the existence and/or characteristics of maritime storms when operating in maritime environments and continental storms when operating in continental environments. It may be possible for a pilot operating radar manually to be able to compensate for the differences in maritime and continental weather as each pilot becomes familiar with the environment. However, knowledge by the pilot must be acquired, and further, an increase in pilot workload is also necessitated. Therefore, there is a need for an automated system of adjusting radar thresholds based on the presence of maritime or continental weather environments.

In addition, weather can vary within certain geographic regions. For example certain regions above the ocean and certain regions above land masses can have weather systems whose characteristics differ from other regions above the same ocean or land mass. Accordingly, it would be desirous to provide a radar system which can compensate radar detection in accordance with known characteristics of certain regions above oceans and land masses. In addition, weather characteristics can change according to seasonal and time-of-day variations. For example, certain radar reflectivities occurring during the monsoon season may indicate hazardous weather while those same radar reflectivities would indicate non-hazardous during another season. Similarly, weather radar returns at a certain time-of-day are more likely to indicate the presence of hazardous weather (e.g., afternoon) while those same returns are less likely to indicate the presence of a hazard at another time-of-day (e.g. early morning).

Still further the weather characteristics can vary by weather type. Often, the reflectivity of certain classes of weather systems may be lower than that which may be detected with the conventionally used on-board radar hardware. For example, stratiform weather has different characteristics than convective weather. Radar thresholds used for convective weather may not provide the appropriate warnings or rain rate indications if the weather is a different type, such as stratiform rain. In addition, weather associated with frontal systems has different characteristics than orographic systems.

Other hazard detection techniques are also affected by the type of weather that is in the environment. For example, models used to detect turbulence, hail, and lightning may not be as effective for one type of weather compared to another type of weather.

The maturity level of a weather cell can also affect weather radar sensing operations. A mature or decaying cell tends to be less hazardous than a cell that is growing. Radar returns and other parameters that indicate a hazard or rain rate for one maturity level may not accurately indicate a hazard for another maturity level.

Accordingly, there is a need for an automated system that adjusts radar tilt or threshold to improve detect ability of weather systems according to weather type, and/or weather maturity. There is also a need to adjust weather radar detection schemes based upon specific weather types and growth. There is further a need to adjust weather sensing in response to weather types by adjusting display thresholds, tilt angle, and/or system gain. Yet further, there is a need for a weather radar system that automatically adjust the weather sensing model in response to types of and/or weather.

It would be desirable to provide a system and/or method that provides one or more of these or other advantageous features. Other features and advantages will be made apparent from the present specification. The teachings disclosed extend to those embodiments which fall within the scope of the appended claims, regardless of whether they accomplish one or more of the aforementioned needs.

SUMMARY OF THE INVENTION

An exemplary embodiment relates to a method of detecting weather on an aircraft using a weather radar system. The method includes determining a classification of weather type, and automatically adjusting the weather radar system in response to the classification of the weather.

Another exemplary embodiment relates to a method of adapting an aircraft weather radar system to a weather type parameter. The method includes determining a weather type and automatically selecting a weather sensing model in response to the weather type. The weather radar system displays weather in response to the weather sensing model.

Still another exemplary embodiment relates to an airborne weather radar system carried on an aircraft. The system includes a radar antenna system and a processing means. The processing means adjusts performance of the weather radar system based on type of weather.

It would be desirable to provide a system and/or method that provides one or more of these or other advantageous features. Other features and advantages will be made apparent from the present specification. The teachings disclosed extend to those embodiments which fall within the scope of the appended claims, regardless of whether they accomplish one or more of the aforementioned needs.

BRIEF DESCRIPTION OF THE DRAWINGS

The invention will become more fully understood from the following detailed description, taken in conjunction with the accompanying drawings, wherein like reference numerals refer to like elements, in which:

FIG. 8 is a more detailed decision matrix for the airborne weather system illustrated in FIG. 1 in accordance with still another exemplary embodiment.

DETAILED DESCRIPTION OF THE PREFERRED EMBODIMENTS

Figure 1:
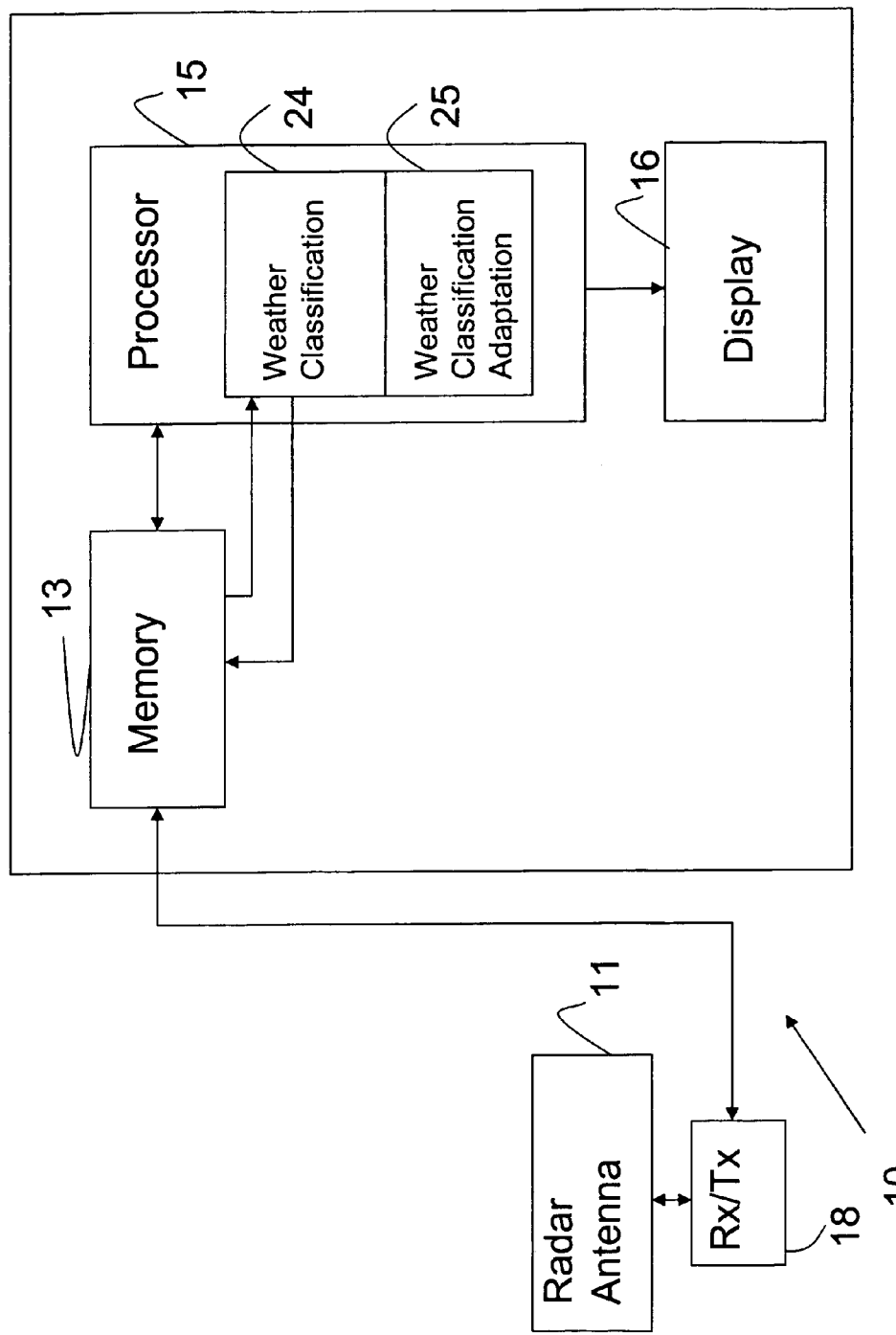
FIG. 1 is a general block diagram of an aircraft weather radar system in accordance with an exemplary embodiment.

Before describing in detail the particular improved system and method, it should be observed that the invention includes, but is not limited to a novel structural combination of conventional data/signal processing components and circuits, and not in the particular detailed configurations thereof. Accordingly, the structure, methods, functions, control and arrangement of conventional components and circuits have, for the most part, been illustrated in the drawings by readily understandable block representations and schematic diagrams, in order not to obscure the disclosure with structural details which will be readily apparent to those skilled in the art, having the benefit of the description herein. Further, the invention is not limited to the particular embodiments depicted in the exemplary diagrams, but should be construed in accordance with the language in the claims.

In conventional continental aircraft systems, air carriers wish to detect threatening weather which may be a threat to the aircraft or passengers. However, in maritime environments, the air carriers attempt to identify weather which may be much milder since maritime carriers have many more available miles to fly, thus they may be able to circumvent any mild weather systems in the maritime environments in an attempt to provide increased passenger comfort.

Continental weather is driven by the low heat capacity of the ground providing exceptional localized heating. In the maritime environment, however, the ocean or other water acts as a modulator of the heat. The water has a high energy capacity and thus there is typically no strong localized convective regions. Further, in some maritime weather systems without heavy localized convection, the clouds may still be very tall, but there may not be a lot of energy in the cloud system. An example of this case is weather at the inter-tropical convergence zone that is characterized by large scale Hadley Cycle uplift that produces clouds to substantial altitudes even when substantial localized convection is not present. This is quite contrary from the continental weather environment where weather height is used by pilots as an indicator of hazard.

The higher in the atmosphere the cloud system of continental weather, the more hazardous the weather system is because it generally requires more energy to cause clouds to reach such an altitude. In maritime weather, the clouds basically rain out at very low altitude because of the limited updraft velocities produced by the very limited localized convection over the temperature moderating water. Thus, by the time the cloud in a maritime environment, even though it may be tall, gets to the altitude of a cruising airplane, there is very little precipitation for the airborne radar to detect. For example, between 35,000 and 36,000 feet, there is approximately 20 or 30 dB difference between the amount of radar return at mid-continental latitudes versus equatorial maritime systems. Thus, for the mid-latitude continental case, the thunderstorm may be very detectable, however, it may be well below the detect ability capability of a weather radar in an equatorial maritime environment. Accordingly, an airborne radar system may be used to identify locations for the changing of radar thresholds in continental, maritime, or transitional regions, among other possibilities.

In addition, regions within continental, maritime, and transitional locations may have specific weather characteristics that require the weather radar system to be adjusted in order to more precisely sense and identify particular types of weather. The adjustments can be made in a variety of fashions including adjusting the tilt of the weather radar antenna, adjusting display thresholds associated with the radar system, or adjusting the gain associated with the transmitted or received signals of the weather radar system. Further, according to another embodiment, the adjustments can be made in accordance with a time-of-day parameter and/or a season parameter. Such parameters may be combined with location parameters to define adjustments that may be made to the weather radar system. For example, Applicants have found that particular regions in maritime environments have weather characteristics that change according to particular location, time-of-day, and seasons. For example, weather that is highly precipitative at a particular time-of-day, in a particular season, or at a particular location in a maritime environment may be indicated as less precipitative according to normal display thresholds, tilt angles, and gain parameters.

Further, Applicants have found that types of weather can be more accurately sensed if weather sensing parameters and/or models are adjusted for the particular weather type. Weather can be classified as: convective, orographic (mountain induced), stratiform, frontal, mature, growing, decaying, tall, short, etc. Once the classification is known, adjustments can be made to display thresholds, tilt angles and antenna transmitter and receiver gains and/or radar detection processes to accommodate the type of weather. In addition, adjustments can be made in response to several classifications: convective, tall, and growing; stratiform, short and mature; orographic, short, and growing; etc.

In addition, the type of weather sensing model can be changed in accordance with the type of weather. The type of weather sensing model may include adjustments to tilt angle, gains, and display thresholds. In addition, the weather model may utilize other parameters depending upon weather type such as lightning correlation, particular hazard sensing, bright band compensation, association with geographical features, etc. Lightning correlation can be employed according to the techniques discussed in U.S. patent application Ser. No. 11/370,085, assigned the filed by Woodell, the Assignee of the present application, et al. on Mar. 7, 2006 incorporated herein by reference. By considering weather type and adjusting the weather sensing operation, Applicants believe that more accurate display of weather can be provided and more accurate sensing of weather can be performed.

Referring to FIG. 1, an aircraft includes a weather radar system 10 capable of casting a radar beam and receiving reflective energy from weather systems. Weather radar system 10 can be similar to the system described in U.S. Pat. No. 6,388,608 configured to include a weather classifier 24 and weather classification adapter 25 as described below. Advantageously, classifier 24 and adapter 25 sense the type of weather and adjust the operation of system 10 in accordance with weather type to improve pilot situational awareness, improve passenger safety, and decrease maintenance due to weather on aircraft.

System 10 preferably includes a radar antenna 11, a processor 15, a memory 13, a display 16 and a receiver/transmitter circuit 18. In a preferred embodiment, weather type 24 and weather classification adapter 25 are part of processor 15. Alternatively, classifier 24 and adapter 25 can be coupled to processor 15, to another part of system 10, or to other aircraft electronics.

Classifier 24 and adapter 25 are shown in FIG. 1 as part of processor 15 and as receiving inputs from processor 15 or other components within system 10. However, classifier 24 and adapter 25 can receive parameters and data from various aircraft instrumentation to make a weather classification determination and adaptations, respectively. Classifier 24 and adapter 25 can be operated in conjunction with the operations of processor 15 or separately from the operations of processor 15. Classifier 24 and adapter 25 can be embodied as their own software routines operating on their own platform or line replaceable unit.

In a preferred embodiment, weather radar system 10 is a pulse Doppler radar system. System 10 preferably includes a weather radar return processing unit (e.g., processor 15) that can calculate standard deviations of wind velocities, a mean velocity parameter, a spectral width parameter, a range parameter, a weather height parameter and reflectivity parameter to generate turbulence alerts, and to provide a display signal to display 16. System 10 is also capable of recording historical data for use in cell growth analysis. In one embodiment, system 10 detects reflectivity by measuring the power of the returned signal. Velocity is measured by detecting changes in phase angle of returned pulses. Spectral width is measured by detection variation in change of phase angle of returned pulses. Cell height is determined by comparing return power levels at different tilt angles or by examining data from a volumetric memory representing different altitudes.

Display 16 preferably provides color graphical images corresponding to the intensity of the radar returns. The graphical images can represent weather regions, rainfall densities, turbulence regions, etc. System 10 can cause display 16 to provide visual indications of potential hazards including icons. In one embodiment, audio alerts are also provided. Preferably, display 16 can provide hazard warnings or hazard outputs. The hazard warnings and hazard outputs can be adjusted in accordance with the type of weather detected by classifier 24. Adapter 25 can make the adjustment to the level of hazard output or the type of hazard output. Hazard outputs include, but are not limited to the following: turbulence, lightning, hail, icing, high reflectively, wind shear, bow waves above cells, and turbulence down wind of cells.

System 10 can be a WXR-2100 MultiScan™ radar system or similar system manufactured by Rockwell Collins configured to include the features associated with hazard detection (e.g., detection of high wind, hall, lightning, etc.). According to certain embodiments, system 10 can be an RDR 4000 system or similar system manufactured by Honeywell International, Inc. configured to include the features associated with classifier 24 and adapter 25. The type of weather radar system is not disclosed in a limiting fashion. The principles of the present invention are applicable to any aircraft weather radar system in which sensing of potential and actual hazards is performed.

Advantageously, system 10 can determine the type of weather by utilizing the reflectivity parameter, weather height location, external system data, reflectivity versus temperature parameter, reflectivity versus altitude parameter, mean velocity parameter, spectral width parameter, etc. Applicants believe that the use of these parameters, which are available on current radar systems, allows classification of weather systems. Once classified, adapter 25 can adjust operation of system 10 or choose a weather sensing model for the classification of the weather system.

The details about system 10 are provided in an exemplary fashion. The principles of the present application are applicable to any weather radar system utilizing radar data for a display. The specific type of calculations are not described in a limiting fashion unless specifically recited in the claims. The various components and circuits described below can be implemented in almost any hardware or software configuration depending upon design parameters and system criteria.

In a preferred embodiment, processor 15 and classifier 24 and adapter 25 are implemented in software subroutines executed on processor 15. The subroutines can be executed on one or more digital signal processors associated with system 10. In one embodiment, system 10 uses a hardware platform of a WXR-2100 weather radar system manufactured by Rockwell Collins, Inc. or an RDR 4000 weather radar system manufactured by Honeywell International, Inc. However, the present invention is not limited to any type of hardware platform.

In operation, processor 15 of system 10 provides signals, either directly to receiver/transmitter circuit 18 or indirectly through memory 13, to provide radar beams at radar antenna 11. Preferably, processor 15 is configured to operate system 10 as a pulse Doppler multi-scan, multi-tilt angle radar system or a volumetric radar system in which radar beams are produced at more than one tilt angle. Processor 15 receives radar returns through receiver/transmitter circuit 18.

Processor 15 can receive the radar returns (or signals/data related thereto) directly or through memory 13. Receiver/ transmitter circuit 18 can be a single path or can have separate circuits for a receive path and a transmit path. Processor 15 can determine at least a reflectivity parameter, a mean velocity parameter and/or a spectral width parameter for use by system 10.

Figure 2:
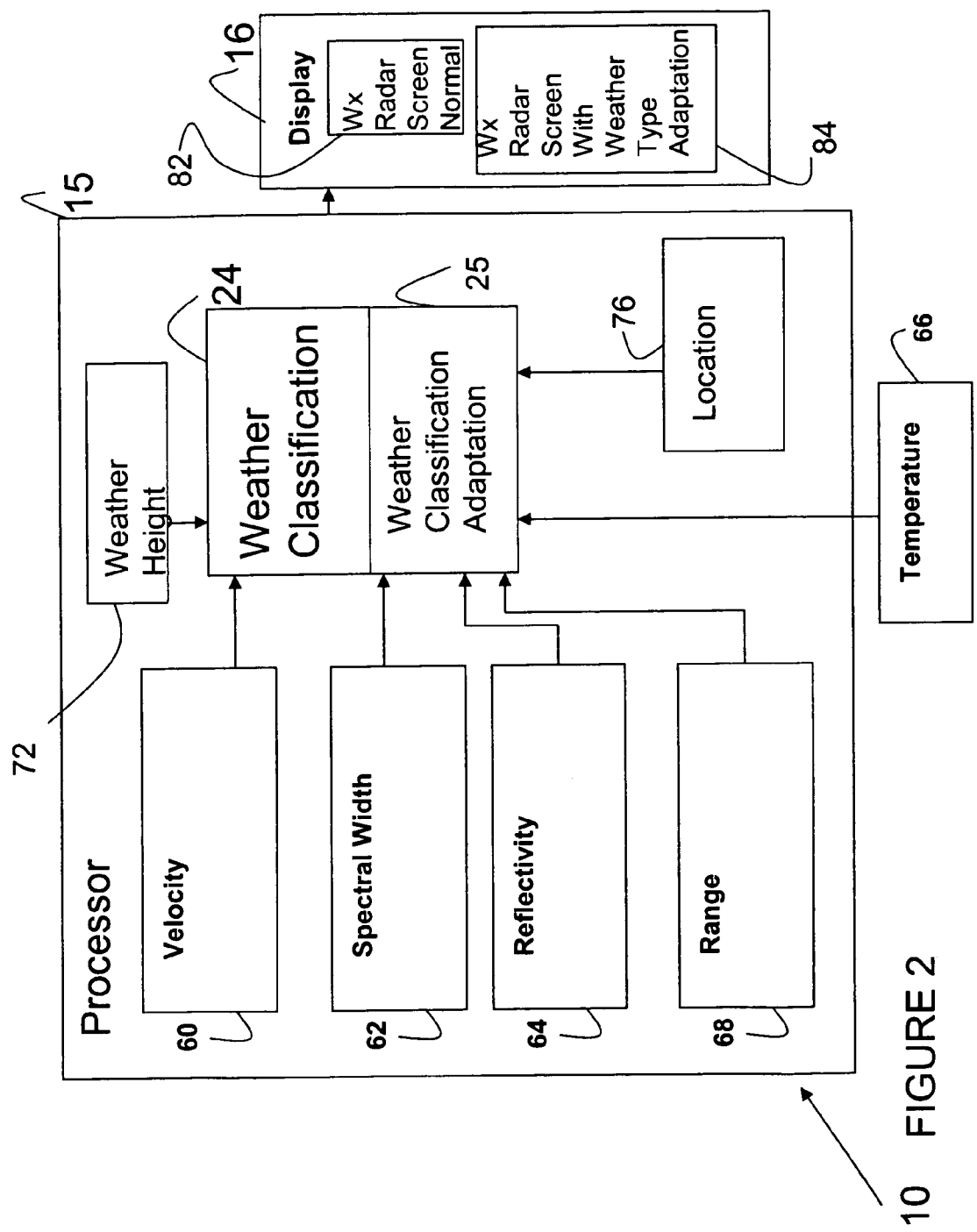
FIG. 2 is a more detailed exemplary block diagram of the radar system illustrated in FIG. 1 in accordance with another exemplary embodiment circuit.

With reference to FIG. 2, weather classifier 24 preferably receives a mean velocity parameter 60 and a spectral width parameter 62 derived from weather radar returns. Alternatively, other types of velocity parameters can be utilized. In addition, processor 15 can provide a reflectivity parameter 64 and a range parameter 68 to classifier 24. Further, a separate temperature sensor 66 can be provided to classifier 24 or temperature can be estimated using existing data and atmospheric conditions. A location parameter 76 and parameters from off system 10 can be provided to classifier 24.

Classifier 24 can also receive a weather height indication (e.g., weather height parameter 72) calculated by processor 15. Weather height indicates the height of a weather cell and can be used to classify weather systems. Classifier 24 can also receive external data from external weather reports from other aircraft systems, from other aircraft, from ground control, etc. The external data indicates the type of weather (e.g., by observation) in the environment. In one embodiment, an indication of a classification of weather for the flight plan is provided to system 10.

In one exemplary embodiment, classifier 24 can classify between stratiform and convective weather by determining the weather height of the weather system or cell. Further, the weather height can be compared to the freezing point in the atmosphere to assist in determining whether the weather type is stratiform or convective. Stratiform weather tends to have a weather height around or below the freezing point. In contrast, the 30 dBz point for convective weather tends to be at approximately the altitude which is at a temperature of negative 10 degrees Celsius (C). Therefore, if the weather has a 30-dBz point at an altitude at which the atmosphere is negative 15 degrees C., the weather is likely a convective system as opposed to a stratiform system.

According to another embodiment, classifier 24 can receive a surface reflectivity parameter. Reflectivities of 30 to 40 dBz generally indicate convective weather. However, classifier 24 must exclude warm tropical rains which can have surface reflectivity in the 30-50 dBz range.

According to another alternative embodiment, classifier 24 can use reflectivity heights. High reflectivity that extends above the freezing altitude tend to indicate a convective system and low vertical heights and low reflectivity tend to indicate a stratiform system. However, classifier 24 preferably classifies high reflectivity constrained to low altitudes as non-convective weather because high reflectivity at low altitude tends to reflect tropical rains which are often non-convective weather.

In yet another embodiment, classifier 24 can utilize horizontal gradients to determine if the weather is convective. Convective weather tends to have higher horizontal gradients as opposed to stratiform weather. In addition, classifier 24 can adjust various weather radar parameters to sense types of weather. For example, the weather radar may use different pulse lengths, chirp patterns, pulse repetition frequencies, scan-types, scan-speeds, ranges, transmitter gains, receiver gains, tilt angles, etc. to classify weather. Further, classifier 24 can utilize lightning data such as from a lightning sensor to determine if convective weather is present.

Once the weather is classified, adapter 25 can adapt the weather sensing model used by system 10. Adapter 25 can choose a variety of weather sensing models optimized for the particular weather being sensed, orographic, stratiform, convective, growing, decaying, mature, etc. Each of these weather models can have various weather sensing parameters changed accordance with weather type.

Display 16 preferably includes a normal weather radar screen 82 and a weather type adaptation area weather radar screen 84. Weather radar screen 84 preferably includes weather sensed according to an adapted process. Screen 84 can be provided along with or separately from screen 82. In one preferred embodiment, the pilot can toggle between screens 82 and 84 based upon a manual input. Hazard indications or icons may also be displayed on screens 82 and 84 in response to the classification of weather type.

System 10 can increase or decrease the displayed hazard level to the crew based on the classification of weather type/phase and associated data. Hazards can be displayed in multiple forms such as color levels, dithered or density modulated colors, line boundaries around hazard areas or regions, icons or symbols, etc. System 10 can predict any of several hazards above, near or within the weather feature based on the classification of weather type/phase and associated data. These can include but are not limited to turbulence, lightning, hail, icing, high reflectivity, windshear, bow waves above cells, turbulence downstream of cells, etc. These predicted hazards can be displayed as color levels, dithered or density modulated colors, line boundaries around hazard areas or regions, icons or symbols, etc. System 10 may predict hazards based on classification of weather type/phase combined with other aircraft sensors such as lightning sensors, infrared or visible imaging sensors, clear air turbulence sensors, etc.

System 10 may predict hazards based on classification of weather type/phase combined with data from ground sources or other aircraft. This data could include but not limited to: ground radar reflectivity, velocity, turbulence, cell tops, cell motion, cell predictions, atmospheric sounding data, winds aloft, surface reports, ground based lightning network data, airborne radar reflectivity, velocity, turbulence data from another aircraft, insitu turbulence data from other aircraft, satellite images, satellite radar data, forecasts, etc.

Radar system 10 includes a radar antenna 11 for sending and receiving radar signals. System 10 also includes an adjustable gain circuit 11 that is configured to change the gain of the radar signal provided to radar antenna 11. In an exemplary embodiment, adapter 25 accesses a database which contains information relating to the type of weather, including but not limited to convective, stratiform, frontal, tall, short, growing, mature, etc. Adapter 25 may also be configured with instructions which calculate and/or determine an appropriate adjustable threshold command via a control law which is based on the type of weather being observed.

The adjustable threshold command can be communicated to an adjustable threshold circuit based on data supplied to processing circuit 15 such as but not limited to the weather type, temperature inputs, and the radar beam direction. Further, other information such as latitude, longitude, location, time-of-day, time-of-year, etc. may also be used to make the gain adjustment. The database may be used to describe whether a specific location (i.e., latitude, longitude) is either a maritime or continental location. The database may be generated from a table of altitudes versus latitude/longitude. Also, sea level locations may represent maritime locations. Above sea level locations may be considered continental locations. Further, the generated database may be used to identify and remove ground clutter targets. For example, in continental environments, the entire sample field may be clutter, like for some antenna geometries. In this case, some terrain features may produce various radar returns. For situations where these terrain features produce radar returns, the database may be used as a source of clutter threshold information, to reduce terrain returns from the weather radar display.

A threshold control law used in adjustable threshold circuit can also be based on whether the weather type. The thresholds may be adjusted according to the weather type using the adjustable threshold circuit, and thereby display, on display 16, the appropriate weather-hazard alert or condition. Other types of alerts may also be used and be based on the adjustable thresholds, including but not limited to a visual and aural warnings.

The radar returns may be normalized depending on the environment in which it is detected. This may be used for any type of weather radar that operates in a range of environments. This includes simple auto-tilt radars, manual radars, as well as fully automatic systems which use all possible environmental data including but not limited to the WXR-2100 MultiScan™ radar available from Rockwell Collins of Cedar Rapids, Iowa.

In an alternative embodiment, adapter 25 may be used to control antenna tilt, gain control on the receive side, gain control on the transmit side and display thresholds. In yet another alternative, adapter 25 can select a weather sensing model based upon the weather type.

A terrain database may further be used to bias the threshold process, the gain control process, or antenna tilt. Antenna beams which impinge on ground have their effective gain reduced during sampled ranges that have that interaction. This allows island and mountain situations to not be displayed to the pilot and allows increased weather detection characteristics in intervening areas between island, land or mountain areas. The gain reduction system differs from an editing system in that boundary values may be softened to reduce the effects of identification mistakes and still allow weather detection in the area influenced by land, island, or mountain targets.

In a similar manner, the thresholds used in multibeam clutter rejection processes may be modified by using the terrain data base to improve weather detection margins and improve clutter removal robustness. This may allow lower antenna beam angle to interrogate weather while providing clutter rejection for precipitous terrain.

System 10 can be advantageously configured to automatically adjust to a particular location parameter, time-of-day parameter, and/or season parameter as well as weather type. The location parameter can provide a precise latitude and longitude, a general area, a distance along a flight plan or other type location indicator. The location parameter can be provided by any type of location sensor including a GPS system. The location parameter can also be provided from an off-airplane source or be derived from flight plans and time-of-flight parameters.

Location parameter 76 provides a location parameter to processor 15. In one embodiment, the location parameter 76 can be used in the weather classification operation. For example, convective weather is more likely present above land environments. Location parameter 76 can indicate a specific geographic region. Some specific geographic regions that have particular weather characteristics include: the North Atlantic where the nominal antenna elevation reduction would produce overestimation of weather or around dry equatorial Africa where again Hadley cycle uplift produces high clouds but similar to the maritime equatorial environment all substantial reflectivity occurs at low altitudes. The use of location can assist in making a weather-type classification. For example, orographic weather is location dependent and stratiform weather is more likely over ocean regions.

In an alternative embodiment, the location parameter can indicate a specific region having a predetermined area. For example, the location parameter can be any area, but typical examples would be in the range of 100 to 1000 square mile regions. The size and/or borders of regions can change as a function of time-of-day or season.

A clock circuit can provide an indication of time-of-day to classifier 24 and adapter 25. A date circuit can provide a time-of-year indication to classifier 24. Classifier 24 can use time and date to classify the type of weather. Adapter 25 can also use time and date to assist its adaptation based on weather type. For example, convective weather may be more likely present in the afternoon in the summer than in the early morning in the winter.

Parameters can be communicated to processor 15 through memory 13. Processor 15 does not need to communicate through memory 13 and can communicate directly to processor 15 or through other circuitry, devices and systems.

Antenna controlled elevations and radar gains can also be a function of time-of-year and time-of-day. As an example of time-of-year adjustments, consider the seasonal movements of the ITCZ (Inter-Tropical Convergent Zone). Lines of high altitude clouds with possible embedded thunderstorms follow the ITCZ's seasonal movement that tracks the sun North and South. The latitude of the ITCZ is both a function of the time-of-year and the local latitude/longitude. Radar gains should peak at the latitudes of the ITCZ while antenna tilts will be most depressed for low altitude weather reflectivity at these same latitudes. An example of time-of-day adjustment involves low thunderstorm probability over Africa at early to mid-morning as compared to a very high probability in late afternoon. So even if gain and antenna would be normally positioned for equatorial detection (elevated gain and depressed antenna positions), such detection at early to mid-morning in these low probability periods would likely present an aircraft crew with a false warning. Therefore, the suite of increased gain and depressed antenna control should not be applied at these early morning hours.

Figure 3:
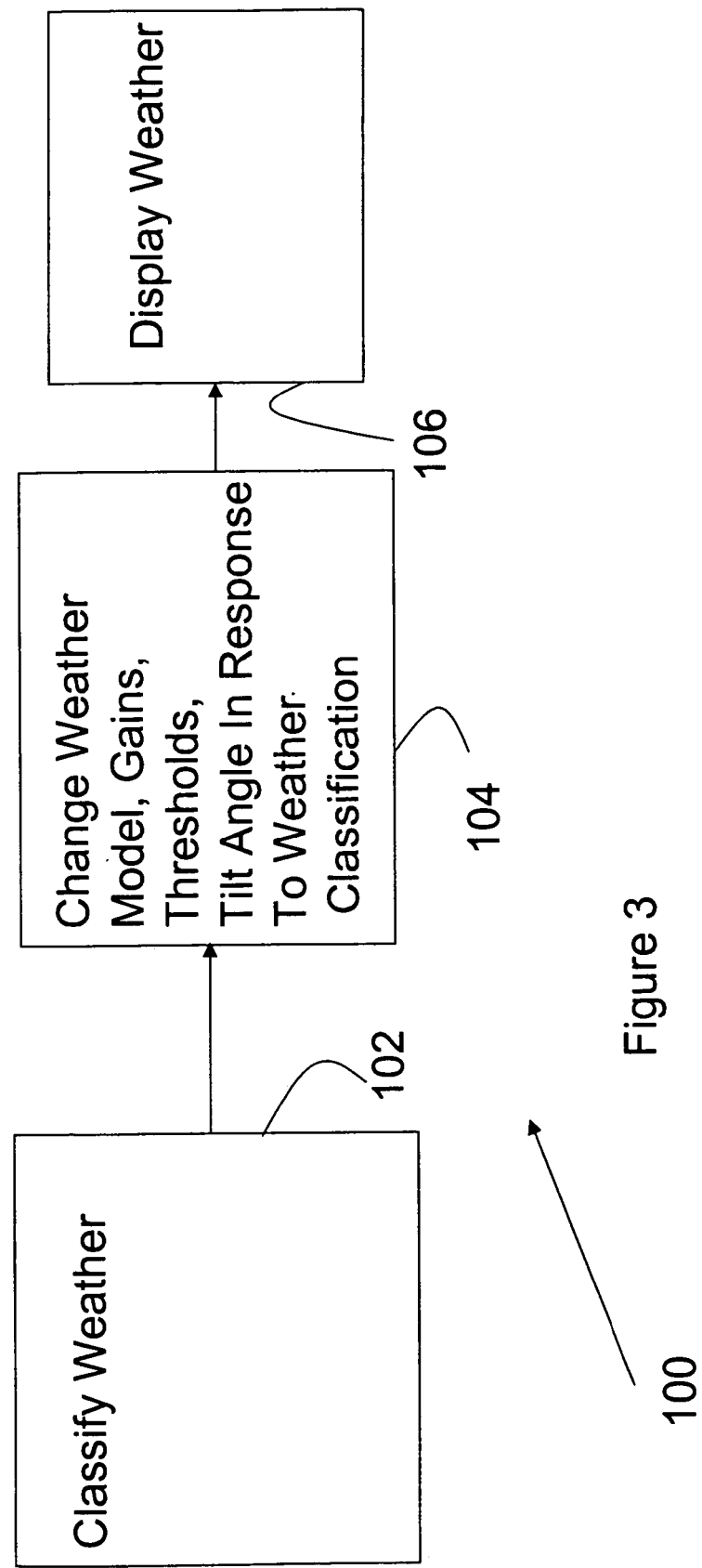
FIG. 3 is a flow diagram of the operation of the airborne weather radar system illustrated in FIG. 1 in accordance with yet another exemplary embodiment.

With reference to FIG. 3, a flow diagram 100 shows operation of system 10. At a step 102, weather is classified by weather classifier 24. At a step 104, adapter 25, adapts the operation of system 10 to accommodate the classification of weather. Adapter 25 can change a weather sensing model, can change display thresholds, tilt angles, and/or gains in response to the type of weather classification. At a step 106, weather is displayed according to the changed weather model, display thresholds, tilt angles and/or gains. In addition, as described above system 10 can further change weather sensing in response to location, time of day, time of year, etc.

As discussed above, the weather can be classified in step 102 according to various embodiments. In one embodiment, weather type is classified as convective or non-convective (e.g., stratiform). In another embodiment, weather type is classified as frontal, non-frontal or orographic. In another embodiment, weather type is classified according to its maturity level. In another embodiment, weather type is classified according to its cell height. In addition, the weather can be classified in accordance with any combination of the above classifications. These weather type parameters can be utilized in a decision matrix to make changes to the weather sensing model, and display thresholds as explained below with reference to FIGS. 7 and 8.

Figure 4:
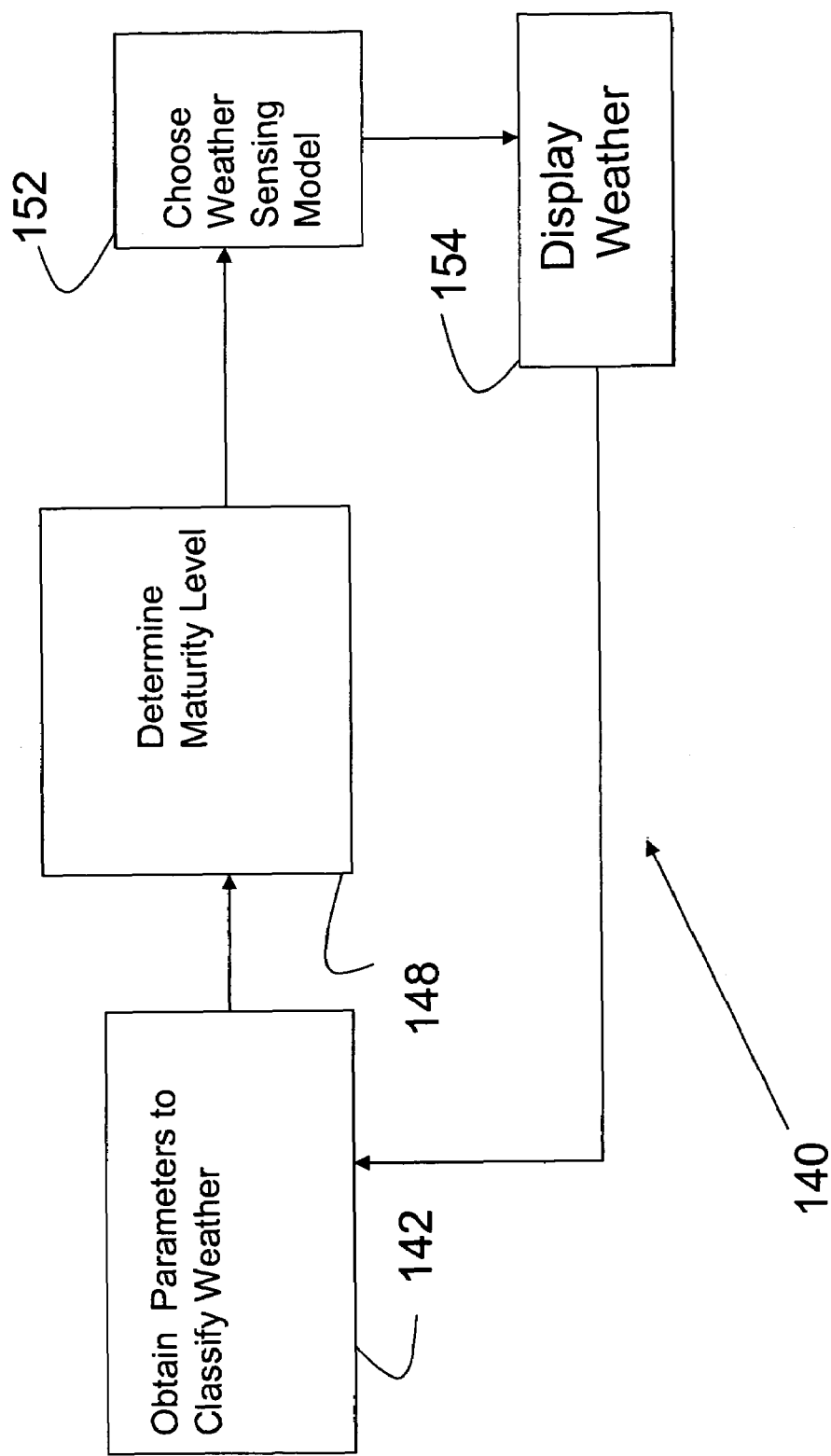
FIG. 4 is a flow diagram of the operation of the airborne weather radar system illustrated in FIG. 3 in accordance with still another exemplary embodiment.

With reference to FIG. 4, system 10 operates according to an alternative flow diagram 140. According to flow diagram 140, system 10 operates to obtain parameters to classify weather. The parameters at a step 142 can include cell height, convective cell identification, reflectivity versus temperature gradients, velocity parameters, spectral width parameters, reflective type parameters, range parameters, location parameters, temperature parameters, etc. The classification process may make adjustments to various radar parameters (pulse length chirp patterns, pulse repetition frequencies, scanning types, ranges, gains, tilt angles, etc.) as part of the classification process.

The maturity level can be determined by a variety of techniques. In one embodiment, a weather height parameter is utilized to determine the maturity of the weather. The weather height parameter can be compared to recent historical data to determine if the weather height is growing (indicating a growing as opposed to a mature cell). If the weather height is shrinking or staying at the same level, a more mature weather height is present.

In addition, the classification process can utilize data from other aircraft systems such as but not limited to atmospheric temperature, aircraft altitude, geographic location, time of day/date, flight management system flight path, insitu wind, on-board lightning sensor, on-board clear air turbulence sensor, on-board infrared imaging system, on-board visible camera, etc. The classification process may utilize pre-stored data, data uplinked from ground sources or datalinked from other aircraft to assist in the weather type/phase classification including but not limited to: ground radar reflectivity, velocity, turbulence, cell tops, cell motion, cell predictions, atmospheric sounding data, winds aloft, surface reports, ground based lightning network data, airborne radar reflectivity, velocity, turbulence data from another aircraft, insitu turbulence data from other aircraft, satellite images, satellite radar data, forecasts, etc.

The weather sensing model 152 chosen at step 152 can include correlation of enhanced lightning sensing depending upon the classification of the weather and the maturity level allows system 10 focus sensing efforts on lightning hazards when conditions are likely for lightning hazards. Further, system 10 can perform other types of hazard detection based upon the maturity level and weather type. Lightning is more likely to occur in cells that are highly convective and growing. Mature cells or non-convective cells are less hazardous.

System 10 can also be configured to provide generic or targeted radar operations depending upon the weather type and/or maturity level. Once types of weather and maturity levels have been identified, specific processes may be optimized to characterize and display the weather types. The weather types may differ across the scan of system 10. Accordingly, when a particular weather type is detected in a certain area, a certain weather sensing model can be utilized for that area. In contrast, if another weather type is sensed in a different area, a different weather sensing model is utilized. Further, scanning a more particular hazardous weather type region may be increased at the expense of scanning in a less hazardous region to provide the best information about the most hazardous weather. Direct dedicated antenna sweeps can be utilized on particular weather cells or locations. The sweeps may use vertical, horizontal, or specialized scan patterns. The sweeps may also utilize modified radar processes, such as modified pulse widths, pulse repetition rate, pulse compression, system gain, antenna speed/dwell profiles, etc. In addition, the classification process may associate individual weather cells or features with different classifications into larger regions. These regions may further be classified into the following but not limited to mesoscale convective systems, frontal systems, super cells, squall lines, etc.

Figure 5:
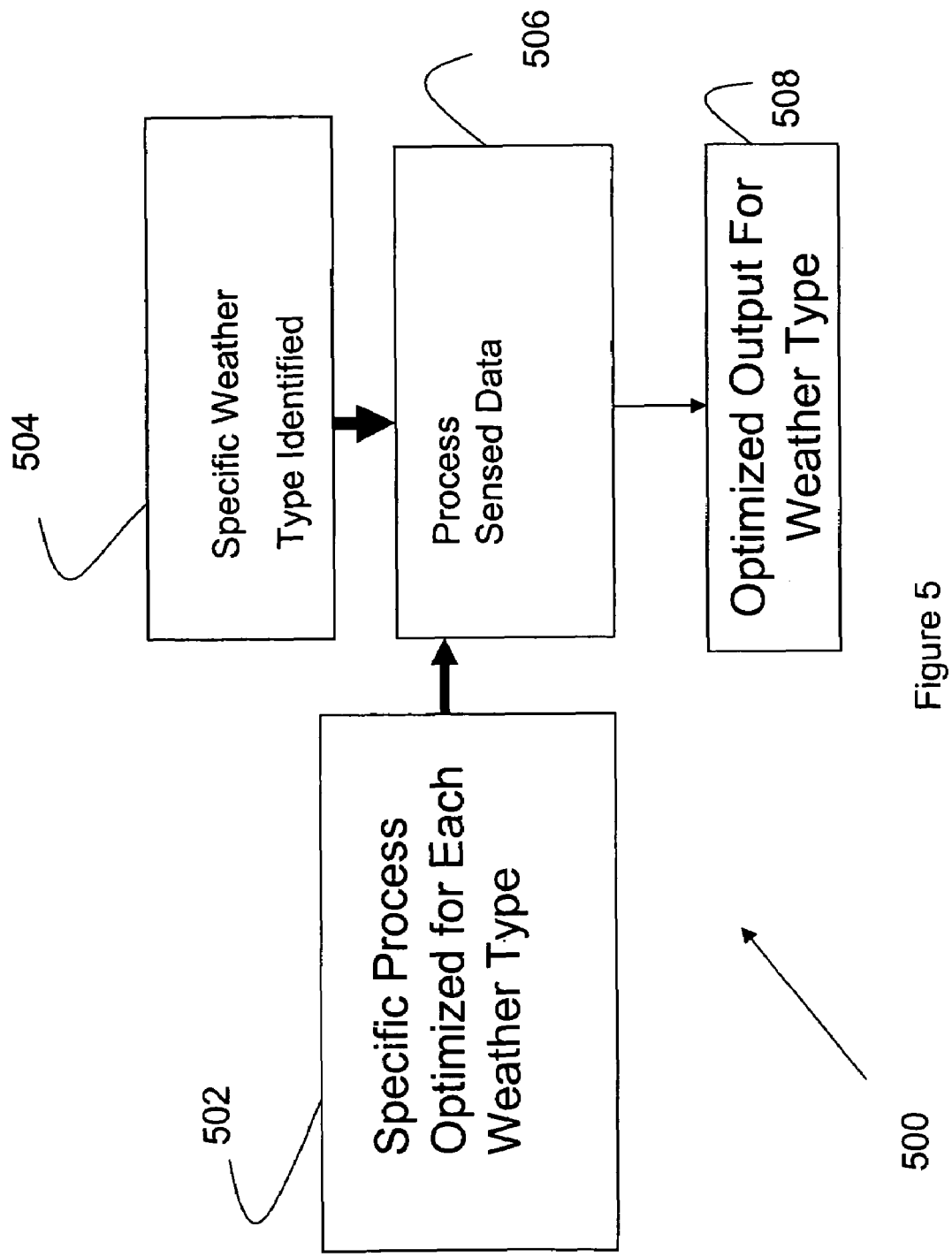
FIG. 5 is a flow diagram showing the operation of the airborne weather system illustrated in FIG. 1 in accordance with yet still another exemplary embodiment.

With reference to FIG. 5, a flow diagram 500 shows another alternative exemplary operation of system 10. At a step 504, specific weather types are identified. At a step 502, specific processes itemized for each weather type sense are selected. The process can be similar or identical to those shown in FIG. 8.

At a step 506, sensed data is processed for the specific weather type. At a step 508, optimized data is output for the particular weather type. The output can be provided on display 16.

Figure 6:
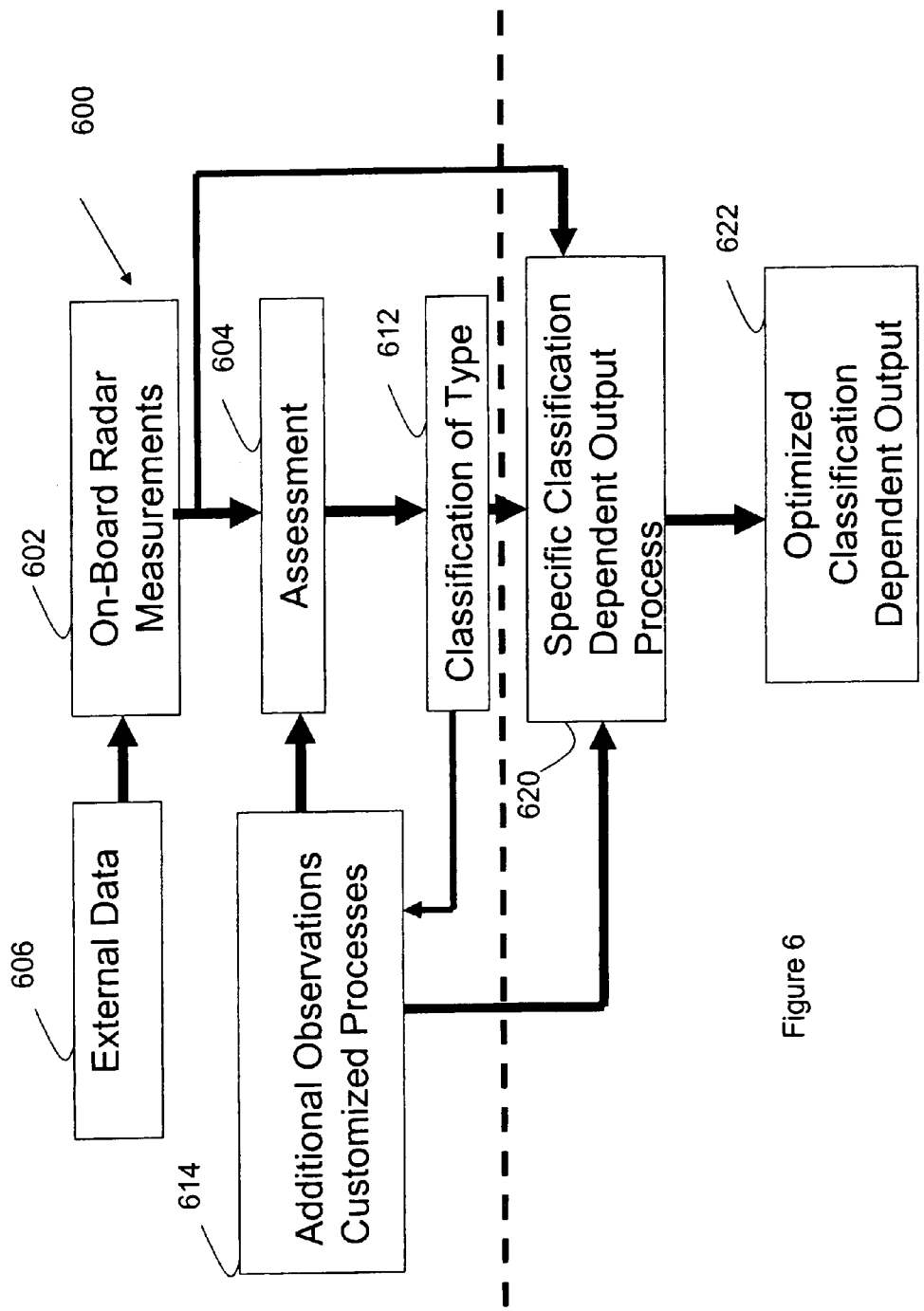
FIG. 6 is a flow diagram of the operation of the airborne weather system illustrated in FIG. 1 in accordance with another exemplary embodiment.

With reference to FIG. 6, a flow diagram 600 shows yet another exemplary operation of system 10. Flow diagram 600 shows a process in which weather is classified according to type and phase of development. Weather data is used to classify weather and continually assess the classification. The weather data is also used in a specific classification dependent output process to provide an optimized classification output of sensed weather.

At a step 602, weather information is obtained. The weather information can include on board radar measurements. On board radar measurements include all weather sweeps and additional data obtained by the on-board radar system itself (e.g., system 10).

In one preferred embodiment, the weather information obtained in step 602 includes any normal radar returns, turbulence data, height information, reflectivity, reflectivity contours and other data that the radar has gathered during scanning processes including data stored in memory.

Weather information can also be provided from external data at a step 606. External data includes any associated information from sources external to the radar (e.g., system 10) and includes aircraft derived data (altitude, air temperature, airspeed, groundspeed, geographic location, time/data, on-board lightning sensor, etc.) as well as data from outside the aircraft (parametric descriptions from ground sources, tops, reflectivity, cell motions, forecasts, turbulence, velocity, winds, atmospheric temperature, atmospheric stability indexes, ground radar images or representations, satellite data, sounding data, ground based lightning data, etc.).

At a step 604, an assessment of the weather type and/or cell development phase can be made. To gather more information for the assessment, system 10 can schedule additional antenna sweeps, antenna dwell periods, vertical sweeps, horizontal or volumetric sweeps to gather additional observations in a step 614. These sweeps may be directed toward the cell or region of interest such as cell tops, mid levels, freezing level or surface and may include examination along the aircraft flight path or surrounding regions. In addition, the system radar may use customized radar processes during these additional antenna sweeps to gather appropriate information needed for the assessment. The customized processes may radically alter the radar operating parameters such as transmitter pulse width, pulse repetition frequency, system gains, pulse compression strategies, turbulence processing, Doppler velocity processing, etc. The assessment process may also utilize data stored in planar or volumetric memory gathered during previous sweeps using standard or customized radar processes.

Step 604 can utilize both radar measurements and external data to determine a weather type classification and cell development phase such as those listed in FIG. 8. Step 604 may require the radar to gather additional information in a step 614 before a weather type classification and cell development phase can be determined.

After additional information is gathered in step 614, the assessment process of step 604 may require successive examinations to gather more specific information or develop time histories for each weather cell or region of interest (step 614).

Once step 614 has been completed, system 10 determines the weather type and phase of a given cell or region of interest in a step 612. This type and phase determination are used to select the specific classification dependent output process in a step 620.

Classification dependent output processes are applied in step 620 upon the classification and/or cell development phase. Step 624 uses data from steps 602 and 614 to sense weather. The classification found in step 612 is continually reassessed via step 604.

At a step 622, an optimized classification dependent output is provided based upon the specific classification dependent output process in step 620 (e.g., FIG. 8). The optimized output may reduce or increase hazard warnings or precipitation levels shown on display 16 based upon weather type and/or cell development phase.

Figure 7:
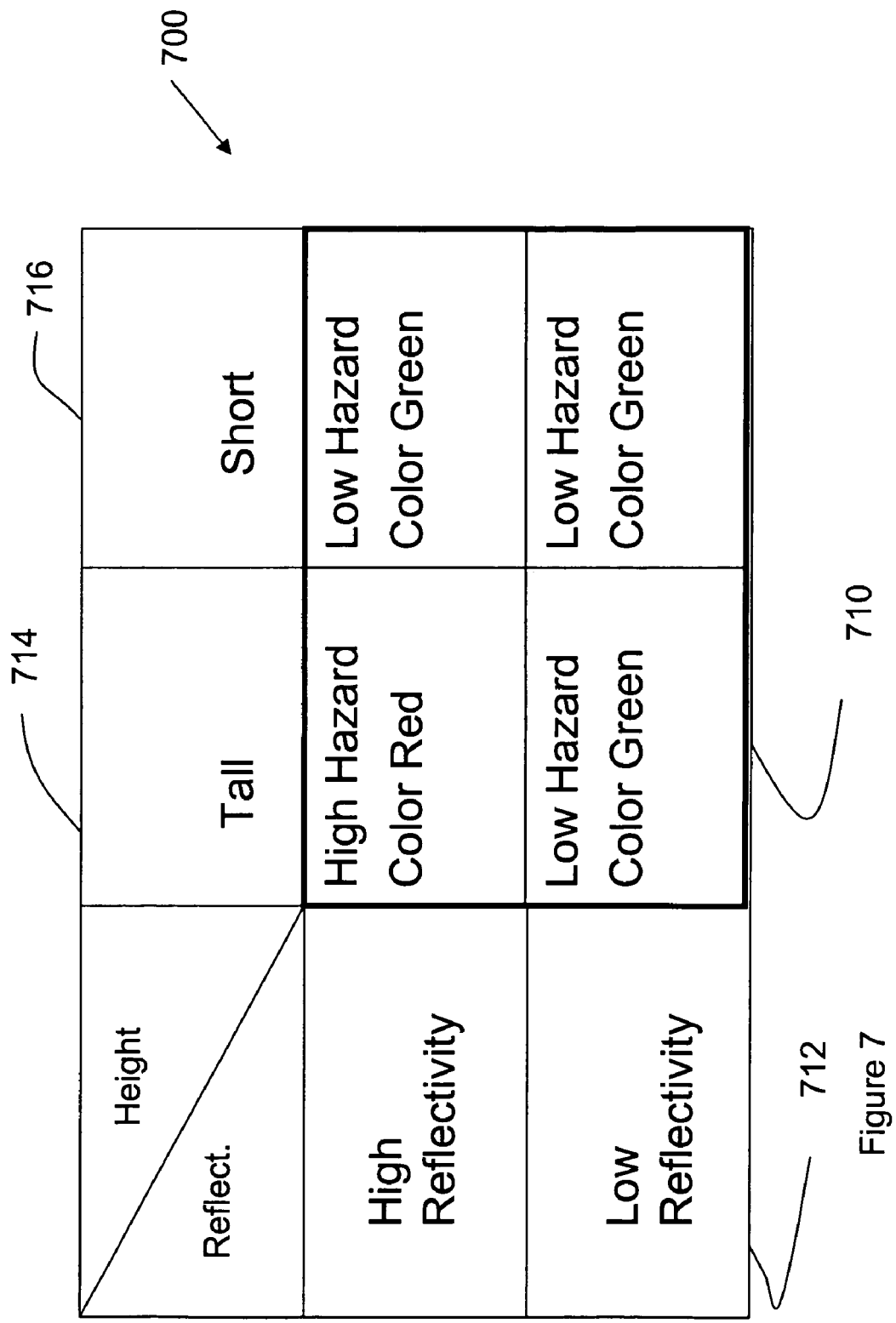
FIG. 7 is a drawing of a decision matrix for the airborne weather system illustrated in FIG. 1 in accordance with an exemplary embodiment.

With reference to FIG. 7, a matrix 700 is provided for adapting system 10 to particular types of weather. Matrix 700 includes a column 712 including reflectivity types, a column 714 including for tall weather heights and a column 716 for short weather heights.

Alternative weather heights such as specific altitude ranges can also be chosen for column 714 of matrix 700. Weather heights can be also chosen with respect to the temperature at which water freezes in the atmosphere for column 714. Column 710 can also include various levels of reflectivity.

Although only two columns are shown for weather height, chart 700 can include additional columns. Further, matrix 700 can include additional columns and dimensions for additional weather parameters.

Section 710 of matrix 700 provides the output for display 16 (e.g., display thresholds). High reflectivity for tall weather heights is provided as a high hazard or red color. The same high reflectivity for a short weather height is provided as a low hazard or green color on display 16. Low reflectivity at high weather heights is shown as a low hazard or color green. A low hazard and color green is also shown for a short weather heights at low reflectivity.

With reference to FIG. 8, specific classification dependent output processes are shown in a table 800 according to a preferred embodiment. Table 800 includes a column 804 for various weather classifications, a column 806 for adapted processing, and a column 810 for intended outputs. Table 800 provides only an exemplary set of examples and that each weather type could have many more adaptations, process changes or associations in addition to those listed.

With reference to FIGS. 1 and 8, when classifier 24 senses convective growing weather, an adapted process using a growth gain model, a growth prediction model, and lightning correlation is implemented by adapter 25. The output of the adapted process can provide vertical hazard extensions and over flight hazard predictions.

When classifier 24 senses a convective, mature cell, a mature gain model and a mature hazard allocation, and lightning correlation can be implemented by adapter 25. The output of the adapted process can provide convective hazard alerts, lightning alerts, hail alerts and turbulence alerts.

Conventional systems such as the current MultiScan system manufactured by Rockwell Collins, Inc., applies a vertical gain curve that is intended to compensate for the drop in cell reflectivity at cold temperatures experienced at altitude. Current models contain curves for 'continental' and 'maritime' cell types. These curves are based on general averages and may not reflect the nature individual cells during their growth—maturity—decay cycle. In this example, given specific knowledge of an individual cell's maturity, a vertical gain model is selected to provide a more accurate representation of that cell and the hazard represented. In the case of a known convective cell in the growing stage of development, the cell would have moderate reflectivity at altitudes near and above the freezing level. This reflectivity could drop off fairly rapidly.

An example of a specific output process for a "convective-growing" cell is:
1) Apply a gain model that increases gain rapidly for the upper portions of the cell to indicate increased hazard at the upper levels.
2) Predict that cell height will increase and depict a hazardous region above the cell due to a potential 'bow wave' over the top.
3) Predict lightning potential due to updrafts inherent in building cells—indicate this lightning potential to the flight crew.

The output process for a convective mature cell would be different. Since the cell is at full maturity, it manifesting a broad range of hazards. An example of specific output process for convective-mature cells is:
1) Apply a gain model that increases gain at high altitudes to indicate the hazardous nature of this cell. This model will not increase gain as much as the building cell due to the expected greater reflectivity at high altitudes.
2) Indicate turbulence, lightning and possibly hail hazard warnings to the flight crew.
3) Indicate probability of lightning due to the convecting nature of the cell.

When classifier 24 senses a convective decaying weather, a decaying gain model is implemented by adapter 25. The intended output of the adapted process includes lightning hazard indications and deemphasized reflectivity hazard levels.

In a convective decaying cell, since the cell is or has rained out, the hazard potential of this cell is diminished even though a large cloud may still be present. An example of a specific output processes for a convective-decaying model is:
1) Apply a gain model that reduces the intensity of the display to reflect the diminished hazard content of the cell.

When stratiform weather is sensed by classifier 24, a stratiform gain model and a bright band compensation model is implemented by adapter 25. The intended output of the adapted process is to reduce hazard indications. In a stratiform system, since stratiform rain presents no hazard (with the exception of possible icing), an exemplary output process for stratiform rain is:
1) Reduce displayed intensity of the rain to green at most to indicate minimal hazard content.
2) Apply bright band compensation which reduces the displayed intensity of echoes near and just below the freezing level to green.

When orographic weather is sensed by classifier 24, the process can be associated with geographic features and an orographic gain model can be implemented by adapter 25. The intended output of the adaptor process reduces hazard indications.

In an orographic system, since orographic cells are created by mechanical lifting of airflow over terrain features rather than by convective, orographic weather cells are likely less hazardous than convective cells. An example of a specific process for these cells is:
1) Apply a gain model that de-emphasizes the intensity of the cell to reflect low hazard content.

These specific output processes discussed above can also be applied separately to individual regions within a larger weather system. For example, individual weather cells or features with different classifications can be associated into larger regions. Classifier 24 can classify larger regions as mesoscale convective systems, frontal systems, super cells and squall lines. These classifications can be made by examining the environment and making classifications of individual cells. When a classification of individual cells meets criteria for the larger classification (e.g., mesoscale convective systems, frontal systems, super cells, and squall lines), classifier 24 makes the classification.

As stated earlier, these are only a minimum set of examples of how the output and warnings levels to flight crews could be adapted based on the actual characteristics of the weather itself.

While the detailed drawings, specific examples and particular formulations given describe preferred and exemplary embodiments, they serve the purpose of illustration only. The inventions disclosed are not limited to the specific forms shown. For example, the methods may be performed in any of a variety of sequence of steps. The hardware and software configurations shown and described may differ depending on the chosen performance characteristics and physical characteristics of the radar system devices. For example, the type of device, communications bus, or processor used may differ. The systems and methods depicted and described are not limited to the precise details and conditions disclosed. Furthermore, other substitutions, modifications, changes, and omissions may be made in the design, operating conditions, and arrangement of the exemplary embodiments without departing from the scope of the invention as expressed in the appended claims.

What is claimed is:

1. A method of detecting weather on an aircraft using a weather radar system, the method comprising:
   determining a classification of the weather using return data from the weather radar system; and
   automatically selecting a weather sensing model in response to the classification of the weather, wherein the weather radar system uses the selected weather sensing model to further analyze the weather;
   wherein at least one of transmitter pulse width, pulse repetition rate, pulse compression, system gain, customized radar processing, radar thresholds, customized antenna dwell profile, and customized antenna speed profile is adjusted to further analyze the weather in the selecting step.

2. The method of claim 1, wherein the classification includes a parameter for weather height, maturity level, phase of development, frontal systems, or orographic systems.

3. The method of claim 1, wherein the classification is made in response to at least one of reflectivity versus a vertical temperature gradient parameter, reflectivity verses altitude isotherms, a weather height parameter, and a temperature parameter.

4. The method of claim 1, wherein the classification is based upon information including at least one of: altitude-based information, time-of-day based information, and seasonal information.

5. The method of claim 1, wherein the determining step uses at least one of:
   data obtained from radar azimuth or elevation sweeps, and
   data stored in a planar or volumetric memory.

6. The method of claim 1, wherein the selecting step includes:
   directing dedicated azimuth, elevation or diagonal antenna sweeps to acquire more information about the weather.

7. A method of adapting an aircraft weather radar system to a weather type parameter, the method comprising:
   determining the weather type parameter associated with weather sensed by the aircraft weather radar system; and
   automatically selecting a weather sensing model in response to the weather type parameter, wherein the weather radar system displays the weather in response to the weather sensing model;
   wherein the determining step utilizes external data, the external data including at least one of radar geographic location data, aircraft altitude data, atmospheric temperature data, location data, aircraft altitude data, time-of-day data, date data, flight management-system flight path data, in situ wind data, other wind source data, on-board lightning sensor data, on-board clear air turbulence sensor data, on-board infrared imaging sensor data, and on-board visual camera data.

8. The method of claim 7, wherein a location parameter is derived from a position determining means and is used in the determining step.

9. The method of claim 7, wherein a weather type parameter is provided from external the weather radar system.

10. The method of claim 7, wherein the selecting occurs in response to at least one of: a location parameter, a seasonal parameter, and a time-of-day parameter.

11. The method of claim 7, wherein the external data further includes at least one of ground radar reflectivity data, velocity data, turbulence data, cell tops data, cell motion data, cell predictions data, atmospheric data, winds aloft data, surface reports data, ground based lightning data, and satellite data.

12. The method of claim 7, wherein selecting the weather sensing model includes changing at least one of a tilt angle, a selected memory from either a volume memory or planar beam memory, a gain, and a threshold for a display.

13. The method of claim 7, further comprising: using stored weather radar data to display images representing the weather.

14. The method of claim 13, wherein the stored weather radar data is also used to determine the weather type.

15. An airborne weather radar system carried on an aircraft, the system comprising:
   a radar antenna system;
   a processing means for determining a type of weather, wherein the processing means selects a software routine from a group of possible weather radar software routines for further analyzing the weather, the software routine corresponding to the type of the weather detected by the weather radar system; and
   a classification means for associating individual weather cells or features with different classifications into larger regions, wherein the larger regions are classified into at least one of the following: mesoscale convective systems, frontal systems, super cells, and squall lines.

16. The airborne weather radar system of claim 15, wherein the processing means changes a level of hazard output or a type of hazard in response to the type of weather.

17. The airborne weather radar of claim 15, wherein the processing means selects the software routine in response to at least one of stratiform weather, convective weather, orographic weather, frontal weather, mature weather, growing weather, decaying weather, tall weather, and short weather.

18. A method of detecting weather on an aircraft using a weather radar system, the method comprising:
   determining a classification of the weather using return data from the weather radar system; and automatically selecting a weather sensing model in response to the classification of the weather, wherein the weather radar system uses the selected weather sensing model to further analyze the weather;

wherein the classification is at least one of convective weather, stratiform weather, orographic weather, frontal weather, tropical warm rain, and another identifiable weather type; and wherein the classification includes a phase of development.

19. The method of claim 18, wherein the classification is determined in response to at least one of reflectivity versus a vertical temperature gradient parameter, reflectivity verses altitude isotherms, a weather height parameter, and a temperature parameter.

20. The method of claim 18, wherein the classification is determined based upon information including at least one of: altitude-based information, time-of-day based information, and seasonal information.

21. The method of claim 18, wherein the determining step uses at least one of:
data obtained from radar azimuth or elevation sweeps, and
data stored in a planar or volumetric memory.

* * * * *